(12) United States Patent
Simon et al.

(10) Patent No.: US 9,156,968 B2
(45) Date of Patent: Oct. 13, 2015

(54) RUBBER COMPOSITION INCLUDING A FUNCTIONALIZED THERMOPLASTIC POLYMER

(75) Inventors: Nathalie Simon, Clermont-Ferrand-Cedex (FR); Stéphanie De Landtsheer, Clermont-Ferrand-Cedex (FR)

(73) Assignees: Compagnie Generale Des Etablissements Michelin, Clermont-Ferrand (FR); Michelin Recherche Et Technique S.A., Granges-Paccot (CH)

( * ) Notice: Subject to any disclaimer, the term of this patent is extended or adjusted under 35 U.S.C. 154(b) by 15 days.

(21) Appl. No.: 13/995,805

(22) PCT Filed: Dec. 13, 2011

(86) PCT No.: PCT/EP2011/072546
§ 371 (c)(1),
(2), (4) Date: Jul. 26, 2013

(87) PCT Pub. No.: WO2012/084599
PCT Pub. Date: Jun. 28, 2012

(65) Prior Publication Data
US 2013/0296475 A1 Nov. 7, 2013

(30) Foreign Application Priority Data
Dec. 20, 2010 (FR) ...................... 10 60813

(51) Int. Cl.
| | | |
|---|---|---|
| *C08L 83/00* | (2006.01) |
| *C08L 47/00* | (2006.01) |
| *C08L 9/00* | (2006.01) |
| *B60C 1/00* | (2006.01) |
| *C08F 8/42* | (2006.01) |
| *C08L 9/06* | (2006.01) |
| *C08C 19/25* | (2006.01) |

(52) U.S. Cl.
CPC ................ *C08L 9/00* (2013.01); *B60C 1/0016* (2013.04); *C08C 19/25* (2013.01); *C08F 8/42* (2013.01); *C08L 9/06* (2013.01); *C08F 2810/40* (2013.01); *C08L 2205/03* (2013.01)

(58) Field of Classification Search
USPC ....................................... 524/506
See application file for complete search history.

(56) References Cited

U.S. PATENT DOCUMENTS

| | | | |
|---|---|---|---|
| 5,212,227 A * | 5/1993 | Sakazume et al. ............ 524/504 |
| 5,821,290 A | 10/1998 | Labauze |
| 6,013,718 A | 1/2000 | Cabioch et al. |
| 6,037,418 A | 3/2000 | Mukai et al. |
| 2002/0019484 A1 | 2/2002 | Nahmias et al. |
| 2002/0183436 A1 | 12/2002 | Robert et al. |
| 2003/0212185 A1 | 11/2003 | Vasseur |
| 2008/0009564 A1 | 1/2008 | Robert et al. |
| 2008/0132644 A1 | 6/2008 | Lapra et al. |
| 2008/0156404 A1 | 7/2008 | Brunelet et al. |
| 2009/0171029 A1 | 7/2009 | Masaki et al. |
| 2009/0270558 A1 | 10/2009 | Gandon-Pain et al. |
| 2009/0292063 A1 | 11/2009 | Robert et al. |
| 2010/0022714 A1 | 1/2010 | Varagniat et al. |
| 2011/0021702 A1 | 1/2011 | Gandon-Pain et al. |
| 2012/0095153 A1* | 4/2012 | Tokimune et al. ............ 524/526 |

FOREIGN PATENT DOCUMENTS

| | | | |
|---|---|---|---|
| EP | 0 767 206 A1 | 4/1997 | |
| EP | 0 778 311 A | 6/1997 | |
| EP | 0 867 471 A1 | 9/1998 | |
| EP | 1 008 464 A1 | 6/2000 | |
| EP | 1 748 052 A1 | 1/2007 | |
| JP | 02020563 A * | 1/1990 | ............ C08L 101/00 |
| JP | 2006-274045 A | 10/2006 | |
| JP | 2010-209256 A | 9/2010 | |
| WO | WO 96/37547 A2 | 11/1996 | |
| WO | WO 01/92402 A1 | 12/2001 | |
| WO | WO 02/10269 A2 | 2/2002 | |
| WO | WO 2005/087859 A1 | 9/2005 | |
| WO | WO 2006/061064 A1 | 6/2006 | |
| WO | WO 2006/069792 A1 | 7/2006 | |
| WO | WO 2006/069793 A1 | 7/2006 | |
| WO | WO 2007/017060 A1 | 2/2007 | |
| WO | WO 2008/003434 A1 | 1/2008 | |
| WO | WO 2008/003435 A1 | 1/2008 | |
| WO | WO 2010/116988 A1 | 10/2010 | |

OTHER PUBLICATIONS

Abstract of JP 02020563, Jan. 24, 1990.*

(Continued)

*Primary Examiner* — Hui Chin
(74) *Attorney, Agent, or Firm* — Dickinson Wright PLLC

(57) ABSTRACT

The present invention relates to a diene rubber composition reinforced with an inorganic filler comprising a thermoplastic polymer bearing, at at least one end, a silanol or silyl ether functional group. The presence of the functional thermoplastic polymer makes it possible to improve the compromise of performances, which are the handling and the grip, of a tire having a tread that is based on such a composition.

15 Claims, No Drawings

(56) References Cited

OTHER PUBLICATIONS

International Search Report (PCT/ISA/210) issued on Feb. 17, 2012, by the European Patent Office as the International Searching Authority for International Application No. PCT/EP2011/072546.

K. Suzuki et al., "Synthesis and Condensation of 3-(Triethoxysilyl)propyl-Terminated Polystyrene", Polymer Journal, Dec. 15, 2003, pp. 938-944, vol. 35, No. 12.

* cited by examiner

RUBBER COMPOSITION INCLUDING A FUNCTIONALIZED THERMOPLASTIC POLYMER

BACKGROUND

1. Field

The present invention relates to the treads of tires and to the rubber compositions used for the manufacture of such treads.

It relates more particularly to the treads of tires reinforced with reinforcing inorganic fillers such as siliceous or aluminous fillers, these treads being intended in particular for tires that are fitted to motor vehicles.

2. Description of Related Art

Ideally, a tire tread must meet a large number of often conflicting technical requirements, including a high wear resistance, a low rolling resistance, a high grip both on dry ground and on wet, snowy or icy ground, while giving the tire a very good level of handling on a motor vehicle, in particular a high drift thrust or cornering.

To improve the handling it is known that a greater stiffness of the tread is desirable, it being possible for this stiffness of the tread to be obtained for example by increasing the amount of reinforcing filler or by incorporating certain reinforcing resins into the constituent rubber compositions of these treads.

However, such a stiffness of the tread, at the very least for its surface portion that is in contact with the ground when the tire is running, as is known adversely affects, usually prohibitively, the grip properties.

In order to satisfy these two contradictory requirements, which are the handling and the grip, one solution consists in creating a stiffness gradient via an accommodation phenomenon of the rubber composition of the tread as is described in patent application WO 02/10269. This accommodation phenomenon is expressed by the ability of the rubber composition to become less stiff at the surface of the tread under the effect of the strains undergone by the tread when the tire is running. This reduction in the stiffness at the surface of the tread does not occur, or occurs only slightly, on the inside of the tread, which thus retains a higher level of stiffness than the surface of the tread. This stiffness gradient of the rubber composition has the advantage of being long-lasting, since the accommodation phenomenon occurs throughout the lifetime of the tire when it is running.

In view of the aforegoing, it is a constant objective to provide rubber compositions for tire treads that satisfy a compromise of performance between grip and handling.

This objective is achieved in that the inventors have discovered that the use of certain thermoplastic polymers as a non-reinforcing filler in a rubber composition reinforced by an inorganic filler gave the rubber composition, unexpectedly, a stiffness gradient and thus made it possible to improve the compromise of performances which are the handling and the grip, especially on wet ground, of a tire having a tread that is based on such a composition.

The use of thermoplastic polymers is well known in rubber compositions, as demonstrated by the publication of numerous documents relating to this subject, such as for example patent applications EP 0 867 471 A1, EP 1 008 464 A1 or US 2002/0019484. More particularly, polyvinylaromatic thermoplastic polymers having a weight-average molar mass between 2000 g/mol and 50000 g/mol are known for being used in rubber compositions for tread in order to increase the hysteresis of the rubber compositions comprising them without adversely affecting their breaking property. Such rubber compositions are described in patent applications EP 1 748 052 A1 and JP 2006-274045, which actually show an increase in the hysteresis without degrading the breaking strength.

SUMMARY

The inventors have now demonstrated that functionalized thermoplastic polymers would give the rubber composition comprising them a stiffness gradient that therefore makes it possible to satisfy the contradictory requirements which are the handling and the grip.

Thus, one subject of the present invention is a reinforced rubber composition based on at least a diene elastomer, a non-reinforcing filler comprising a thermoplastic polymer, a reinforcing filler comprising a reinforcing inorganic filler, a coupling agent providing the bond between the diene elastomer and the reinforcing inorganic filler, characterized in that the thermoplastic polymer has a number-average molar mass, Mn, between 500 g/mol and 20000 g/mol, and bears, at at least one chain end, a specific functional group selected from the group consisting of $Si(OR^1)_n R^2_{(3-n)}$, $Si(OH)R^1_2$ or $(SiR^1_2-O)_p-H$, where:

$R^1$, which are identical or different, each represent a monovalent hydrocarbon-based group selected from alkyls, which are linear or branched, cycloalkyls or aryls, having from 1 to 18 carbon atoms, $R^2$, which are identical or different, each represent a hydrogen or a monovalent hydrocarbon-based group selected from alkyls, which are linear or branched, cycloalkyls or aryls, having from 1 to 18 carbon atoms, the hydrocarbon-based group optionally bearing at least one functional group selected from a primary, secondary or tertiary amine, an imine or an epoxy, n represents an integer ranging from 1 to 3, p represents an integer ranging from 2 to 30.

Another subject of the invention is a tire comprising at least one semi-finished rubber product, preferably a tread, consisting completely or partly of the reinforced rubber composition as defined above. Such a tire has a good compromise of performance between the grip and the handling.

DETAILED DESCRIPTION OF SPECIFIC EMBODIMENTS

The expression composition "based on" is understood to mean a composition comprising the mixture and/or the reaction product of the various constituents used, some of these base constituents being capable of reacting or intended to react with one another, at least in part, during the various phases of manufacture of the composition, in particular during the crosslinking or vulcanization thereof.

In the present description, unless expressly indicated otherwise, all the percentages (%) shown are % by weight.

As regards the contents of functional groups, a functional group content for a given functional group expressed as x % means that x chains out of 100 chains bear the given functional group.

The abbreviation "phr" stands for parts by weight per hundred parts of elastomer or rubber (of the total of the elastomers if several elastomers are present).

Furthermore, any range of values denoted by the expression "between a and b" represents the field of values ranging from more than a to less than b (that is to say limits a and b excluded) whereas any range of values denoted by the expression "from a to b" means the field of values ranging from a up to b (that is to say including the strict limits a and b).

An essential characteristic of the rubber composition in accordance with the invention is to comprise at least one diene elastomer.

The expression "diene elastomer" should be understood, in a known manner, to mean an (one or more is understood) elastomer consisting at least partly (i.e., a homopolymer or a copolymer) of units derived from diene monomers (monomers bearing two carbon-carbon double bonds which may or may not be conjugated).

More particularly, the expression "diene elastomer" is understood to mean any homopolymer obtained by polymerization of a conjugated diene monomer having from 4 to 12 carbon atoms or any copolymer obtained by copolymerization of one or more conjugated dienes with one another or with one or more vinylaromatic compounds having from 8 to 20 carbon atoms. In the case of copolymers, the latter contain from 20% to 99% by weight of diene units and from 1% to 80% by weight of vinylaromatic units.

The following are suitable in particular as conjugated dienes: 1,3-butadiene, 2-methyl-1,3-butadiene, 2,3-di($C_1$-$C_5$ alkyl)-1,3-butadienes, such as, for example, 2,3-dimethyl-1,3-butadiene, 2,3-diethyl-1,3-butadiene, 2-methyl-3-ethyl-1,3-butadiene or 2-methyl-3-isopropyl-1,3-butadiene, an aryl-1,3-butadiene, 1,3-pentadiene or 2,4-hexadiene. The following, for example, are suitable as vinylaromatic compounds: styrene, ortho-, meta- or para-methylstyrene, the "vinyltoluene" commercial mixture, para-(tert-butyl)styrene, methoxystyrenes, chlorostyrenes, vinylmesitylene, divinylbenzene or vinylnaphthalene.

The elastomers may have any microstructure which depends on the polymerization conditions used, in particular on the presence or absence of a modifying and/or randomizing agent and on the amounts of modifying and/or randomizing agent employed. The elastomers may, for example, be block, statistical, sequential or microsequential elastomers and may be prepared in dispersion or in solution; they may be coupled and/or star-branched or else functionalized with a coupling and/or star-branching or functionalizing agent.

Preferably, the diene elastomer used in the invention is selected from the group of highly unsaturated diene elastomers consisting of polybutadienes (BR), synthetic polyisoprenes (IR), natural rubber (NR), butadiene copolymers, isoprene copolymers and blends of these elastomers. Such copolymers are more preferably selected from the group consisting of styrene-butadiene copolymers (SBR), butadiene-isoprene copolymers (BIR), styrene-isoprene copolymers (SIR) and styrene-butadiene-isoprene copolymers (SBIR).

The rubber composition in accordance with the invention may contain a single diene elastomer or a blend of several diene elastomers, it being possible for the diene elastomer(s) to be used in combination with any type of synthetic elastomer other than those of diene type, or even with polymers other than elastomers.

The rubber composition in accordance with the invention has another essential characteristic of comprising a non-reinforcing filler comprising a functionalized thermoplastic polymer.

The expression "thermoplastic polymer" is understood to mean a polymer which, under the action of heat, melts or softens enough in order to be able to be shaped. It is understood that the thermoplastic polymer is not crosslinked.

The thermoplastic polymer according to the invention is characterized by a number-average molar mass, Mn, between 500 g/mol and 20000 g/mol and bears, at at least one chain end, a specific functional group.

Such characteristics of the thermoplastic polymer in a rubber composition reinforced by an inorganic filler give the rubber composition in accordance with the invention an ability to exhibit a stiffness gradient. This ability to exhibit a stiffness gradient is determined by the amplitude of the drop in the modulus of the rubber composition at low strain after accommodation. The higher the amplitude of the drop in modulus at low strain of the rubber composition under the effect of the accommodation, the better the compromise between the grip and the handling of the tire comprising a tread based on such a rubber composition.

According to one preferred embodiment, the thermoplastic polymer is a polyvinylaromatic polymer, i.e. a polymer consisting exclusively of vinylaromatic units.

The vinylaromatic monomers are selected from the group consisting of styrene and derivatives thereof, such as for example styrenes for which the benzene ring is substituted by at least one group selected from alkyl, alkoxy, dialkylamino or dialkylaminoalkyl groups. Preferably, the monomers are styrene and ortho-, meta- or para-substituted alkylstyrenes such as for example para-methylstyrene, vinyltoluene and tert-butylstyrene.

According to one preferred embodiment, the content of functional group borne at the chain end of the thermoplastic is at least 80%, more preferably still at least 90%.

When the specific functional group borne at the chain end of the thermoplastic polymer is represented by the generic formula $Si(OR^1)_n R^2_{(3-n)}$, with $R^1$, $R^2$ and n as described above, the thermoplastic polymer may be prepared by living polymerization, in particular by anionic polymerization. The $Si(OR^1)_n R^2_{(3-n)}$ functional group may then be provided during the synthesis of the thermoplastic polymer by reaction of the living chain end of the thermoplastic polymer with a functionalizing agent. Suitable functionalizing agents are alkoxysilanes, preferably dialkoxysilanes or trialkoxysilanes, such as for example glycidoxypropyltrimethoxysilane, glycidoxypropylmethyldimethoxysilane, tetraethoxysilane, methyltrimethoxysilane, dimethyldimethoxysilane, isocyanatopropyltriethoxysilane, dimethylaminopropyltrimethoxysilane, dimethylaminopropylmethyldimethoxysilane, N-(1,3-dimethylbutylidene)-3-(triethoxysilyl)-1-propaneamine, N-n-butyl-aza-2,2-dimethoxy-silacyclopentane as non-limiting examples.

When the specific functional group is represented by the generic formula $Si(OH)R^1_2$, with $R^1$ having the same meaning as above, the functionalization with a silanol group at the chain end of the thermoplastic polymer may be carried out during the synthesis of the thermoplastic polymer, by reaction of the living chain end with a cyclic polysiloxane, such as hexamethylcyclotrisiloxane, according to the process described in patent EP 0 778 311 B1 by adapting the process to the present case. The hexamethylcyclotrisiloxane may be replaced by a dialkyldihalosilane, such as dimethyldichlorosilane; in the latter case the functionalization reaction is followed by a hydrolysis.

When the specific functional group is represented by the generic formula $(SiR^1_2-O)_p-H$, with $R^1$ and p having the same meanings as above, the functional group at the chain end of the thermoplastic polymer is a polysiloxane block, in which case the thermoplastic polymer according to the invention is a diblock polymer consisting of a polysiloxane block and a block corresponding to the thermoplastic chain.

Such a diblock may be synthesized for example by reaction of an α,ω-difunctional polysiloxane with a thermoplastic polymer bearing a reactive site at the chain end. An illustration of this principle of synthesis is given in Japanese patent application JP 3-137107, which describes a hydrosilylation reaction between an ω-vinyl polystyrene and an α-hydride, ω-silanol polysiloxane. The diblock may also be synthesized by reaction of a cyclic polysiloxane, such as hexamethylcyclotrisiloxane, by adapting to the present case the process described in patent EP 0 778 311 B1 applied to diene elastomer chains. The length of the polysiloxane block is adjusted according to the length of the chain of the thermoplastic polymer so that the thermoplastic polymer bearing the polysiloxane block at the chain end, retains its thermoplastic character without acquiring elastomer properties.

According to one preferred embodiment, the thermoplastic polymer according to the invention bears a silanol functional group. According to one more preferred embodiment, this functional group is an Si(OH)R$_2$ functional group, where R is a $C_1$-$C_4$ alkyl, preferably a methyl.

According to one very preferred embodiment of the invention, the thermoplastic polymer in accordance with the invention is a polyvinylaromatic polymer, in particular a polystyrene, having a silanol functional group, and more preferably still the dimethylsilanol group, at the chain end.

Such polymers are obtained in a manner known per se.

Such a thermoplastic polymer derived from vinylaromatic units and bearing the dimethylsilanol functional group at the chain end is for example synthesized according to the series of the following reactions:
  polymerization of the styrene or styrene derivative or mixture thereof by initiation with a lithium compound, and
  reaction of the living polymer chain of styrene nature with hexamethylcyclotrisiloxane before introducing a protic compound, such as for example an alcohol or an acid, into the reaction medium. Instead of the hexamethylcyclotrisiloxane, use may be made of a dihalosilane, such as dimethyldichlorosilane, in which case the reaction is followed by a hydrolysis reaction.

According to another essential characteristic of the invention, the thermoplastic polymer according to the invention has a number-average molar mass, Mn, between 500 g/mol and 20000 g/mol.

Below an Mn of 500 g/mol, the hysteresis of the composition becomes too high and adversely affects the rolling resistance. For an Mn greater than or equal to 20000 g/mol, the amplitude of the drop in the modulus at low strain after accommodation is low in order to create a stiffness gradient. Under these conditions, the composition remains stiff in order to give good grip properties to the tire comprising a tread comprising such a composition.

According to one preferred embodiment, the thermoplastic polymer has an Mn ranging from 1500 g/mol to 10000 g/mol, advantageously from 2000 g/mol to 7000 g/mol. In these preferred ranges of Mn, the stiffness of the composition, expressed by the Shore hardness measurement, is high, and the drop in the modulus at low strain after accommodation is of large amplitude. Under these preferred conditions, a good compromise between the grip and the handling of the tire is achieved.

According to one particular embodiment of the invention, the non-reinforcing filler may comprise more than one thermoplastic polymer according to the invention, in which case the thermoplastic polymers according to the invention may differ at least by one of the following characteristics:
  the microstructure, such as for example by the nature of the monomer units, the proportion thereof or the sequence thereof;
  the macrostructure, such as for example the length of the chain, the presence or absence of branched chains, in particular star-branched chains;
  or by the chemical nature of the functional group borne at the chain end of the polymer.

According to one preferred embodiment of the invention, the chains of the thermoplastic polymer are linear, that is to say not branched.

According to one particular embodiment of the invention, the thermoplastic polymer according to the invention is used in a proportion ranging from 3 to 30 phr. A sufficient stiffness gradient is only obtained from 3 phr onwards of thermoplastic polymer. Beyond 30 phr, the gain in amplitude of the drop in modulus at low strain after accommodation becomes adversely affected by a high increase in the hysteresis of the rubber composition. To further optimize the compromise of performances desired for the tire, which are the handling, the grip and the rolling resistance, the thermoplastic polymer according to the invention is preferably used in a proportion of from 5 to 20 phr, and more preferably still from 8 to 15 phr.

According to one particular embodiment of the invention, the rubber composition may contain, as non-reinforcing filler, in addition to the thermoplastic polymer according to the invention, a thermoplastic polymer not in accordance with the invention, kaolin, chalk or starch as examples. The thermoplastic polymer not in accordance with the invention may be a thermoplastic polymer identical to the thermoplastic polymer in accordance with the invention, except that it does not bear, at the chain end, a functional group in accordance with the invention. Advantageously the non-reinforcing filler predominantly consists of the thermoplastic polymer according to the invention, that is to say that the weight fraction of the thermoplastic polymer according to the invention represents more than 50% by weight of the non-reinforcing filler, more preferably still more than 80% by weight of the non-reinforcing filler.

As another essential characteristic of the invention, the rubber composition in accordance with the invention comprises a reinforcing filler comprising an inorganic filler.

The expression "reinforcing inorganic filler" should be understood in the present application, by definition, to mean any inorganic or mineral filler, whatever its colour and its origin (natural or synthetic), also referred to as "white filler", "clear filler" or even "non-black filler", in contrast to carbon black, capable of reinforcing by itself alone, without means other than an intermediate coupling agent, a rubber composition intended for the manufacture of tires, in other words capable of replacing, in its reinforcing role, a conventional tire-grade carbon black. Such a filler is generally characterized, in a known manner, by the presence of hydroxyl (—OH) groups at its surface.

Preferably the inorganic filler is a silica. The silica used may be any reinforcing silica known to those skilled in the art.

Mention will also be made, as reinforcing inorganic filler, of mineral fillers of the aluminous type, in particular alumina ($Al_2O_3$) or aluminium (oxide)hydroxides, or else reinforcing titanium oxides.

The physical state in which the reinforcing inorganic filler is provided is immaterial, whether in the powder, microbead, granule or bead form. Of course, the expression "reinforcing inorganic filler" is also understood to mean mixtures of various reinforcing inorganic fillers, in particular of highly dispersible silicas.

According to one preferred embodiment, the reinforcing filler predominantly consists of a reinforcing inorganic filler, that is to say that the proportion of reinforcing inorganic filler is greater than 50% by weight of the total weight of the reinforcing filler.

It should be noted that the reinforcing filler may contain, in addition to the aforementioned reinforcing inorganic filler(s), at least one organic filler such as carbon black. This reinforcing organic filler is then preferably present in a weight fraction of less than 50% relative to the total weight of the reinforcing filler.

All carbon blacks, in particular blacks of the HAF, ISAF, SAF, FF, FEF, GPF and SRF types, conventionally used in tire rubber compositions ("tire-grade" blacks) are suitable as carbon blacks.

For example, the black/silica blends or the blacks partially or fully covered with silica are suitable for forming the reinforcing filler. Carbon blacks modified by silica, such as, without implied limitation, the fillers which are sold by Cabot under the name "CRX 2000", and which are described in the international patent document WO-A-96/37547, are also suitable.

Mention may be made, as examples of organic fillers other than carbon blacks, of functionalized polyvinylaromatic organic reinforcing fillers, as described in patent applications WO-A-2006/069792 and WO-A-2006/069793, or else of functionalized nonaromatic polyvinyl organic reinforcing fillers, as described in patent applications WO-A-2008/003434 and WO-A-2008/003435.

Preferably, the content of reinforcing filler is between 30 and 200 phr, more preferably still between 40 and 120 phr.

The carbon black, when it is present, is preferably used in a content of less than 20 phr, more preferably less than 10 phr (for example between 0.5 and 20 phr, in particular between 2 and 10 phr). In the ranges indicated, the colouring properties (black pigmenting agent) and UV-stabilizing properties of the carbon blacks are benefited from, without furthermore adversely affecting the typical performances provided by the reinforcing inorganic filler.

The rubber composition in accordance with the invention also has the essential characteristic of comprising a coupling agent.

The expression "coupling agent" is understood to mean more specifically an agent capable of establishing a satisfactory bond of chemical and/or physical nature between the reinforcing inorganic filler and the diene elastomer, while facilitating the dispersion of this filler within the elastomeric matrix. Such an at least bifunctional bonding agent has, for example, the simplified general formula "Y-T-X'", in which:
  Y represents a functional group ("Y" function) which is capable of being bonded physically and/or chemically to the inorganic filler, it being possible for such a bond to be established, for example, between a silicon atom of the coupling agent and the surface hydroxyl (—OH) groups of the inorganic filler (for example the surface silanols, where silica is concerned);
  X' represents a functional group ("X'" function) capable of being bonded physically and/or chemically to the elastomer, for example via a sulphur atom;
  T represents a divalent group which makes it possible to connect Y and X'.

Preferably, the coupling agent is a silane, more preferably still a silane polysulphide.

In the rubber compositions in accordance with the invention, the content of coupling agent is advantageously less than 20 phr, it being understood that it is generally desirable to use as little as possible thereof. Typically, the content of coupling agent represents from 0.5% to 15% by weight relative to the amount of inorganic filler. Its content is preferably between 0.5 and 12 phr, more preferably within a range extending from 3 to 10 phr. This content is easily adjusted by a person skilled in the art according to the content of inorganic filler used in the composition.

Use may be made, as filler equivalent to the reinforcing inorganic filler described in the present section, of a reinforcing filler of another nature, in particular organic nature, provided that this reinforcing filler is covered with an inorganic layer, such as silica, or else comprises, at its surface, functional sites, in particular hydroxyl sites, requiring the use of a coupling agent in order to establish the bond between this reinforcing filler and the diene elastomer.

The rubber compositions in accordance with the invention may also contain coupling activators, agents for covering the inorganic fillers or more generally processing aids capable, in a known way, by virtue of an improvement in the dispersion of the filler in the rubber matrix and of a lowering of the viscosity of the compositions, of improving their processability in the uncured state, these agents being, for example, hydrolysable silanes, such as alkylalkoxysilanes, polyols, polyethers, primary, secondary or tertiary amines, or hydroxylated or hydrolysable polyorganosiloxanes.

The rubber compositions in accordance with the invention may also comprise all or some of the standard additives customarily used in rubber compositions intended for the manufacture of tires, such as for example pigments, protective agents such as antiozone waxes, chemical antiozonants, antioxidants, antifatigue agents, reinforcing or plasticizing resins, methylene acceptors (for example, phenol-novolac resin) or methylene donors (for example, HMT or H3M), as described, for example, in patent application WO 02/10269, a crosslinking system based either on sulphur or on sulphur donors and/or on peroxide and/or on bismaleimides, vulcanization accelerators, vulcanization activators, adhesion promoters, such as cobalt-based compounds, plasticizing agents, preferably nonaromatic or very slightly aromatic plasticizing agents chosen from the group consisting of naphthenic oils, paraffinic oils, MES oils or TDAE oils, ether plasticizers, ester plasticizers (for example, glycerol trioleates), and hydrocarbon-based resins having a high Tg, preferably of greater than 30° C., as described, for example, in patent applications WO 2005/087859, WO 2006/061064 and WO 2007/017060, and the mixtures of such compounds.

The rubber composition according to the invention is manufactured in a manner known per se in suitable mixers.

Due to its stiffness gradient properties, the rubber composition in accordance with the invention is perfectly suitable for forming a semi-finished product, preferably a tread for a tire. Such a tire exhibits a good compromise of performance between the grip and the handling and constitutes one subject of the invention.

The aforementioned characteristics of the present invention, and others also, will be better understood on reading the following description of several exemplary embodiments of the invention, given by way of illustration and with no implied limitation.

Exemplary Embodiments of the Invention a) The Mooney viscosity ML (1+4) at 100° C. is measured according to the ASTM D-1646 standard with an oscillating consistometer. The Mooney viscosity measurement is carried out according to the following principle: the sample analysed in the uncured state (i.e., before curing) is moulded (shaped) in a cylindrical chamber heated to a given temperature (for example 35° C. or 100° C.). After preheating for one minute, the rotor rotates within the test specimen at 2 rpm and the working torque for maintaining this movement is measured after rotating for 4 minutes.

It is expressed relative to a base 100 with respect to the Mooney viscosity of the control composition. A value below 100 indicates a Mooney viscosity of the composition that is considered to be lower than that of the control composition, which demonstrates an improvement in the processing of the composition compared to the control composition.

(b) The Shore A hardness is measured according to the DIN 53505 standard. It is expressed relative to a base 100 with respect to the Shore hardness of the control composition. A value above 100 expresses an improvement in the handling of the tire.

(c) The moduli of elongation at 300% (MA300), at 100% (MA100) and at 10% (MA10) are measured on an initial test specimen according to the ISO 37 standard at 23° C. The nominal secant moduli at 10% elongation are also measured after an accommodation at 50% or at 100% (i.e. an extension of 50% or 100% respectively followed by a relaxation to 0%). These accommodated moduli are denoted by MA10Ac(50%) or MA10Ac(100%) respectively.

The moduli are expressed relative to a base 100 with respect to the corresponding moduli of the control composition. A value of less than 100 indicates a modulus of the composition that is considered to be lower than that of the control composition.

The amplitude of the drop in the modulus MA10 after accommodation up to 50% or 100% strain is calculated respectively by the relation 100×(1−MA10Ac(50%)/MA10) or 100×(1−MA10Ac(100%)/MA10). This amplitude is expressed as a percentage. The higher this amplitude with respect to the control composition, the greater the ability of the composition to exhibit a stiffness gradient, and the better the compromise between the grip and the handling of the tire.

The reinforcement index, which is the ratio of the modulus MA300 to the modulus MA100, is expressed relative to a base 100 with respect to the control composition. A value above 100 expresses an improvement in the reinforcement of the composition considered relative to the control composition.

(d) The dynamic properties $\tan(\delta)_{max}$ are measured on a viscosity analyser (Metravib VA4000) according to the ASTM D 5992-96 standard. The response of a sample of vulcanized composition (cylindrical test specimen with a thickness of 2 mm and a cross section of 79 mm$^2$), subjected to a simple alternating sinusoidal shear stress, at a frequency of 10 Hz, and under standard temperature conditions (60° C.) according to the ASTM D 1349-99 standard, is recorded. A peak-to-peak strain amplitude sweep is carried out from 0.1 to 50% (forward cycle) and then from 50 to 0.1% (return cycle). The result gathered is the loss factor tan ($\delta$). For the return cycle, the maximum value of tan ($\delta$) observed (tan($\delta$)max) is indicated.

The loss factor is expressed relative to a base 100 with respect to the loss factor of the control composition. A value above 100 demonstrates a higher hysteresis of the composition considered.

On the same equipment, the response of a sample of vulcanized composition (cylindrical test specimen with a thickness of 2 mm and with a cross section of 79 mm$^2$) to a given strain, at a frequency of 10 Hz, under variable temperature conditions, is recorded. The result gathered is the loss factor tan ($\delta$) at 0° C. The loss factor is expressed relative to a base 100 with respect to the loss factor of the control composition. A value above 100 demonstrates a higher hysteresis of the composition considered, expressing a better effectiveness of the composition in terms of grip.

(e) The number-average molar mass and the polydispersity index are determined by SEC (size exclusion chromatography) analysis.

As a reminder, SEC analysis, for example, consists in separating the macromolecules in solution according to their size, through columns filled with a porous gel. The molecules are separated according to their hydrodynamic volume, the bulkiest being eluted first. The sample to be analysed is simply dissolved beforehand in an appropriate solvent, for example tetrahydrofuran at a concentration of 1 g/liter. The solution is then filtered through a filter, for example with a porosity of 0.45 μm, before injection into the equipment. The equipment used is for example a "Waters Alliance" chromatograph. The elution solvent is for example tetrahydrofuran, the flow rate is 0.7 ml/min, the temperature of the system is 35° C. A set of four "Waters" columns in series (trade names "Styragel HMW7", "Styragel HMW6E", and two "Styragel HT6E") is used for example. The volume of the solution of the polymer sample injected is for example 100 μl. The detector is a differential refractometer (for example "Waters 2410") which may be equipped with associated data processing software (for example "Waters Millenium"). A Moore calibration is carried out with a series of commercial polystyrene standards having a low Ip (less than 1.2) and known molar masses, covering the range of masses to be analysed. From the data recorded (weight distribution curve of the molar masses), the weight-average molar masse (Mw), the number-average molar mass (Mn), and also the polydispersity index (Ip=Mw/Mn) are deduced.

(f) The content of functional groups is calculated from the NMR (nuclear magnetic resonance) analysis and following the determination of the number-average molar mass.

Before being analysed, the samples are subjected to:
three cycles of dissolution in toluene and coagulation in methanol to remove any trace of residual functionalizing agent, i.e. functionalizing agent not bonded to the polymer,
then drying in an oven under a stream of nitrogen at 40° C. to remove any trace of residual solvent.

The NMR analyses are carried out on a 500 MHz Bruker spectrometer equipped with a 5 mm BBIz "broadband" probe. For the quantitative $^1$H NMR experiment, the sequence uses a 30° pulse and a repetition time of two seconds. The samples are dissolved in carbon sulphide ($CS_2$). 100 mL of deuterated cyclohexane ($C_6D_{12}$) are added for the lock signal. The $^1$H NMR spectrum makes it possible to quantify the $(CH_3)_2Si$ functional group by integration of the signal characteristic of the $SiCH_3$ protons around the chemical shift δ=0 ppm. The NMR analysis makes it possible to attain the degree of functionalization of the polymer chains in meq/kg. This amount is converted by calculation to a percentage functionalization by taking into account the Mn determined according to the method described in (e).

Preparation of Thermoplastic Polymers

The toluene, methanol and styrene are first sparged with nitrogen.

The reactions are carried out in a bottle or in a reactor under nitrogen pressure. Once the solvents and the reactants are introduced, the bottles are stirred in a bath maintained at a given, regulated temperature. The temperatures recorded are those of the bath in the case of a polymerization carried out in a bottle and are those of the reaction medium in the case of a polymerization carried out in a reactor.

Dimethylsilanol-Functional Polystyrene with an Mn of 2500 g/mol:

Introduced into a bottle containing 150 ml of nitrogen-sparged toluene are 0.60 ml of a 2.0 mol/l solution of tetrahydrofuran in toluene, and 14 ml of styrene. Injected into this solution, cooled to 0° C., are 3.70 ml of a 1.37 mol/l solution of sBuLi. After polymerizing for 20 minutes at 0° C., 4.9 ml of a 0.5 mol/l solution of hexamethylcyclotrisiloxane in toluene are introduced. After reacting for 30 minutes at 60° C., 0.5 ml of methanol is added. After adding 0.80 phr of 2,2-methylenebis(4-methyl-6-tert-butylphenol) and 0.40 phr of N-(1,3-dimethylbutyl)-N-phenyl-p-phenylenediamine, the polymer solution is washed with water until it reaches neutrality. The polymer is recovered dry after drying in an oven under reduced pressure at 60° C. under nitrogen.

The resulting polymer is characterized by an Mn of 2500 g/mol, an Ip of 1.16 and a functional group content of the order of 100%.

Dimethylsilanol-Functional Polystyrene with an Mn of 10000 g/mol:

Introduced into a bottle containing 150 ml of nitrogen-sparged toluene are 0.60 ml of a 2.0 mol/l solution of tetrahydrofuran in toluene, and 14 ml of styrene. Injected into this solution, cooled to 0° C., are 0.93 ml of a 1.37 mol/l solution of sBuLi. The polymerization is carried out at 0° C. At a conversion close to 100%, 1.27 ml of a 0.5 mol/l solution of hexamethylcyclotrisiloxane in toluene are introduced. The reaction is carried out at 60° C. After complete discolouration of the reaction medium heated at 60° C., 0.5 ml of methanol is added. After adding 0.40 phr of 2,2-methylenebis(4-methyl-6-tert-butylphenol) and 0.20 phr of N-(1,3-dimethylbutyl)-N-phenyl-p-phenylenediamine, the polymer solution is washed with water until it reaches neutrality. The polymer is recovered dry after drying in an oven under reduced pressure at 60° C. under nitrogen.

The resulting polymer is characterized by an Mn of 10000 g/mol, an Ip of 1.10 and a functional group content of the order of 100%.

Dimethylsilanol-Functional Polystyrene with an Mn of 6500 g/mol:

Introduced into a reactor containing 65 liters of nitrogen-sparged toluene are 2.4 liters of a 0.4 mol/l solution of tetrahydrofuran in toluene, and 6.5 liters of styrene. Injected rapidly into this solution, cooled to −2° C., is 0.83 liter of a concentrated solution of sBuLi. At 98% conversion, 1 liter of a 0.47 mol/l solution of hexamethylcyclotrisiloxane in toluene is introduced and the reaction medium is taken to 60° C. After reacting for 30 minutes at 60° C., 1 liter of a 2.4 mol/l solution of methanol in toluene is added. 5 minutes afterwards, the polymer solution is washed with water until it reaches neutrality. Next, 1.1 liters of a 50 g/l solution, in toluene, of a mixture of antioxidants comprising respectively 80% and 20% by weight of 2,2-methylenebis(4-methyl-6-tert-butylphenol) and of N-1,3-dimethylbutyl-N-phenyl-para-phenylenediamine. The polymer is recovered dry after drying in an oven under reduced pressure at 60° C. under nitrogen.

The resulting polymer is characterized by an Mn of 6500 g/mol, an Ip of 1.07 and a functional group content of the order of 100%.

Preparation of the Rubber Compositions

In order to prepare the compositions A, B, and C-K, the formulation of which is described in the tables below, the procedure below is followed: introduced successively into a laboratory internal mixer of "Banbury" type, the capacity of which is 400 cm$^3$, which is 75% filled and the initial temperature of which is around 85° C., are:
the elastomers, the oil, the silica, the black, the coupling agent, the antioxidant, the stearic acid, the DPG and the zinc oxide,
for composition B, the methylene acceptor also,
for compositions C-K, the functional polystyrenes also.

The stage of thermomechanical working is carried out for around 3 to 4 minutes, up to a dropping temperature of the order of 160° C. approximately.

The first abovementioned step of thermomechanical working is thus carried out, it being specified that the mean speed of the blades during this first step is 75 rpm.

The mixture thus obtained is recovered and cooled and then, in an external mixer (homofinisher), the sulphur, the sulphenamide, and the methylene donor in the specific case of composition B, are added at 30° C., the combined mixture being further mixed for a time of 3 to 4 minutes.

The compositions thus obtained are subsequently calendered, either in the form of slabs (with a thickness ranging from 2 to 3 mm) or thin sheets of rubber, for the measurement of their physical or mechanical properties, or in the form of profiled elements which can be used directly, after cutting and/or assembly to the desired dimensions, for example as semi-finished products for tires, in particular for treads.

Crosslinking is carried out at 150° C. for 40 min.

In this test, 11 rubber compositions based on diene elastomers, reinforced by silica, are compared. The compositions denoted by A and B are respectively the control and reference compositions for this test. Compositions C-K are all in accordance with the invention: they all contain a silanol-functional polystyrene. The number-average molar mass of the functional polystyrene is 2500 g/mol, 6500 g/mol or 10000 g/mol and the content of functional polystyrene in the composition is 8, 10 or 15 phr. The formulation of these compositions is recorded in Table I below.

TABLE I

| Compositions | A control | B reference | C, F, I invention | D, G, J invention | E, H, K invention |
|---|---|---|---|---|---|
| Diene elastomer (1) | 82.5 | 82.5 | 82.5 | 82.5 | 82.5 |
| Diene elastomer (2) | 40 | 40 | 40 | 40 | 40 |
| Filler (3) | 80 | 80 | 80 | 80 | 80 |
| Coupling agent (4) | 6.4 | 6.4 | 6.4 | 6.4 | 6.4 |
| Filler (5) | 6 | 6 | 6 | 6 | 6 |
| Oil (6) | 9 | 9 | 9 | 9 | 9 |
| DPG (7) | 1.5 | 1.5 | 1.5 | 1.5 | 1.5 |
| Antioxidant (8) | 1.9 | 1.9 | 1.9 | 1.9 | 1.9 |
| Stearic acid | 2 | 2 | 2 | 2 | 2 |
| ZnO | 2.5 | 2.5 | 2.5 | 2.5 | 2.5 |
| Methylene acceptor (9) | | 5 | | | |
| PS-SiOH (10) | | | 8 | 10 | 15 |
| Sulphenamide (11) | 1.2 | 1.2 | 1.2 | 1.2 | 1.2 |

TABLE I-continued

| Compositions | A control | B reference | C, F, I invention | D, G, J invention | E, H, K invention |
|---|---|---|---|---|---|
| Sulphur | 1.2 | 1.2 | 1.2 | 1.2 | 1.2 |
| Methylene donor (12) | | 3 | | | |

(1) = SBR (57% vinyl units of the butadiene part, 26% styrene units, extended with 37.5 phr of aromatic oil)
(2) = BR (93% cis-1,4- units)
(3) = Silica 160MP from Rhodia
(4) = TESPT from Degussa
(5) = Carbon black N234
(6) = Aromatic oil "Enerflex 65" from BP
(7) = Diphenylguanidine from Flexsys
(8) = N-(1,3-dimethylbutyl)-N'-phenyl-p-phenylenediamine, from Flexsys
(9) = Phenol-formaldehyde resin
(10) = SiOH-functional polystyrene having a molar mass that varies according to Table II
(11) = N,N-dicyclohexyl-2-benzothiazyl sulphenamide
(12) = HMT from Degussa

TABLE II

| PS-SiOH | Mn 2500 g/mol | Mn 6500 g/mol | Mn 10000 g/mol |
|---|---|---|---|
| Composition | C, D, E | F, G, H | I, J, K |

Results:

The results of the tests appear in Tables III and IV.

The reference composition B known from the prior art, in particular from the publication of patent application WO 02/10269, for giving a stiffness gradient is characterized:

by an amplitude of the drop in the modulus MA10 after accommodation of 89%, which is much higher than that of the control composition (68%) known for not giving a stiffness gradient in a tire according to WO 02/10269, by a Shore hardness of 117, much higher than the control value, which demonstrates an improvement in the handling compared to the control composition, by a tan (δ) at 0° C. that is higher than the reference, expressing an improvement in the grip performance.

Compositions C-K are characterized:

for all of them, by an amplitude of the drop in the modulus MA10 after accommodation that is greater than that of the control A, some of these compositions such as C, D, E, G and H even have an amplitude of the drop in the modulus MA10 that is both much greater than the control and comparable to the reference B, for all of them, by a Shore hardness that is higher than that of the control A, for most of them, by a tan (δ) at 0° C. that is higher than the reference.

Regarding these characteristics, all these compositions exhibit a stiffness gradient which expresses an improvement in the compromise of performance between the grip and the handling of the tire. This improvement is particularly highly pronounced:

for compositions C, D, E, which comprise a mixture of dimethylsilanol-functional polystyrene with an Mn of 2500 g/mol at contents ranging from 8 to 15 phr, for compositions G and H, which comprise a dimethylsilanol-functional polystyrene with an Mn of 6500 g/mol at contents ranging from 8 to 15 phr.

Furthermore, all the compositions in accordance with the invention are characterized by an ML value that is much lower than that of the control A, or even that of the reference B, which expresses an improvement in the processing of the composition.

TABLE III

| Composition | A control | B reference | C invention | D invention | E invention |
|---|---|---|---|---|---|
| ML(1 + 4) at 100° C. | 100 | 85 | 76 | 75 | 69 |
| Shore A at 23° C. | 100 | 117 | 107 | 116 | 116 |
| $\tan(\delta)_{max}$ at 23° C. | 100 | 107 | 141 | 151 | 161 |
| $\tan(\delta)$ at 0° C. | 100 | 96 | 116 | 114 | 99 |
| MA10 | 100 | 187 | 119 | 133 | 165 |
| MA10 Ac(100%) | 100 | 63 | 32 | 34 | 36 |
| drop in MA10 after accommodation (%) | 68 | 89 | 85 | 89 | 98 |
| MA300/MA100 | 100 | 89 | 89 | 86 | 77 |

TABLE IV

| | Composition | | | | | |
|---|---|---|---|---|---|---|
| | F invention | G invention | H invention | I invention | J invention | K invention |
| ML(1 + 4) at 100° C. | 84 | 82 | 77 | 89 | 88 | 85 |
| Shore A at 23° C. | 103 | 107 | 113 | 101 | 103 | 105 |
| $\tan(\delta)_{max}$ at 23° C. | 127 | 134 | 145 | 109 | 110 | 114 |
| $\tan(\delta)$ at 0° C. | 113 | 114 | 111 | 104 | 105 | 104 |
| MA10 | 116 | 133 | 159 | 119 | 120 | 131 |
| MA10 Ac(100%) | 78 | 81 | 38 | 102 | 95 | 88 |
| drop in MA10 after accommodation (%) | 79 | 81 | 93 | 72 | 74 | 79 |
| MA300/MA100 | 94 | 90 | 83 | 96 | 96 | 92 |

The invention claimed is:

1. A reinforced rubber composition based on at least:
   a diene elastomer,
   a non-reinforcing filler comprising from 3 to 30 phr of a thermoplastic polymer,
   a reinforcing filler comprising a reinforcing inorganic filler,
   a coupling agent providing the bond between the diene elastomer and the reinforcing inorganic filler,
   wherein the thermoplastic polymer has a number-average molar mass, Mn, between 500 g/mol and 20000 g/mol, contains exclusively vinylaromatic units, and bears, at least one chain end, a specific functional group selected from the group consisting of $Si(OR^1)_n R^2_{(3-n)}$, $Si(OH)R^1_2$ or $(SiR^1_2—O)_p$—H, where:
   $R^1$, which are identical or different, each represent a monovalent hydrocarbon-based group selected from alkyls, which are linear or branched, cycloalkyls or aryls, having from 1 to 18 carbon atoms,
   $R^2$, which are identical or different, each represent a hydrogen or a monovalent hydrocarbon-based group selected from alkyls, which are linear or branched, cycloalkyls or aryls, having from 1 to 18 carbon atoms, the hydrocarbon-based group optionally bearing at least one functional group selected from a primary, secondary or tertiary amine, an imine and an epoxy,
   n represents an integer ranging from 1 to 3,
   p represents an integer ranging from 2 to 30.

2. The reinforced rubber composition according to claim 1, wherein the number-average molar mass of the thermoplastic polymer varies from 1500 g/mol to 10000 g/mol.

3. The reinforced rubber composition according to claim 2, wherein the number-average molar mass of the thermoplastic polymer varies from 2000 g/mol to 7000 g/mol.

4. The reinforced rubber composition according to claim 1, wherein the thermoplastic polymer is present in a proportion ranging from 5 to 20 phr.

5. The reinforced rubber composition according to claim 1, wherein the vinylaromatic units are derived from styrene, a styrene derivative, or a mixture thereof.

6. The reinforced rubber composition according to claim 5, wherein the styrene derivative is a para-, ortho- or meta-substituted alkylstyrene.

7. The reinforced rubber composition according to claim 1, wherein the thermoplastic polymer has, at at least one chain end, an $SiR_2OH$ functional group, where R is a $C_1$-$C_4$ alkyl.

8. The reinforced rubber composition according to claim 1, wherein the reinforcing filler predominantly comprises a reinforcing inorganic filler.

9. The reinforced rubber composition according to claim 8, wherein the reinforcing inorganic filler is a silica.

10. The reinforced rubber composition according to claim 1, wherein the diene elastomer is selected from the group consisting of polybutadienes, natural rubber, synthetic polyisoprenes, butadiene copolymers, isoprene copolymers and blends of these elastomers.

11. A tire comprising at least one tread comprising a reinforced rubber composition according to claim 1.

12. The reinforced rubber composition according to claim 1, wherein the thermoplastic polymer is present in a proportion ranging from 8 to 15 phr.

13. The reinforced rubber composition according to claim 7, wherein R is methyl.

14. A semi-finished rubber product comprising a reinforced rubber composition according to claim 1.

15. The semi-finished rubber product according to claim 14, which is a tire tread.

* * * * *